(12) United States Patent
Han et al.

(10) Patent No.: US 8,379,653 B2
(45) Date of Patent: Feb. 19, 2013

(54) REMOTE ACCESS METHOD IN NETWORK ENVIRONMENT COMPRISING NAT DEVICE

(75) Inventors: Se-hee Han, Seoul (KR); Seong-ho Cho, Seoul (KR); Sang-hyeon Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 181 days.

(21) Appl. No.: 12/353,546

(22) Filed: Jan. 14, 2009

(65) Prior Publication Data

US 2009/0180486 A1 Jul. 16, 2009

Related U.S. Application Data

(60) Provisional application No. 61/021,175, filed on Jan. 15, 2008.

(30) Foreign Application Priority Data

Jul. 10, 2008 (KR) .................. 10-2008-0067204

(51) Int. Cl.
*H04L 12/56* (2006.01)
(52) U.S. Cl. ............................................ 370/401
(58) Field of Classification Search .................. None
See application file for complete search history.

(56) References Cited

U.S. PATENT DOCUMENTS

| | | | | |
|---|---|---|---|---|
| 6,667,968 | B1 * | 12/2003 | Tran | 370/352 |
| 6,996,621 | B1 * | 2/2006 | Borella et al. | 709/228 |
| 2002/0085561 | A1 | 7/2002 | Choi et al. | |
| 2003/0103506 | A1 | 6/2003 | Keller | |
| 2006/0018308 | A1 | 1/2006 | Choi et al. | |
| 2006/0123077 | A1 * | 6/2006 | Munetsugu et al. | 709/203 |
| 2007/0076729 | A1 * | 4/2007 | Takeda | 370/401 |
| 2008/0155085 | A1 * | 6/2008 | Yokoyama et al. | 709/223 |

FOREIGN PATENT DOCUMENTS

| | | |
|---|---|---|
| CN | 1435038 A | 8/2003 |
| CN | 101103614 A | 1/2008 |
| KR | 2002-0057079 A | 7/2002 |
| KR | 2003-0057095 A | 7/2003 |
| KR | 10-2004-0060518 A | 7/2004 |

OTHER PUBLICATIONS

Rosenberg, J., "Interactive Connectivity Establishment (ICE): A Protocol for Network Address Translator (NAT) Traversal for Offer/Answer Protocols," MMUSIC, Internet-Draft, The IETF Trust, Oct. 29, 2007, 119 pages.
Rosenberg, J. et al., "Traversal Using Relays around NAT (TURN): Relay Extensions to Session Traversal Utilities for NAT (STUN)," Behave, Internet-Draft, The IETF Trust, Nov. 15, 2007, 39 pages.
Rosenberg, J. et al., "Session Traversal Utilities for (NAT) (STUN)," BEHAVE Working Group, Internet-Draft, The IETF Trust, Nov. 13, 2007, 48 pages.

(Continued)

*Primary Examiner* — Gregory Sefcheck
*Assistant Examiner* — Steve Young
(74) *Attorney, Agent, or Firm* — Sughrue Mion, PLLC

(57) ABSTRACT

Provided is a remote access method between a remote access client (RAC) and a remote access server (RAS) in a network comprising a network address translation (NAT) device. The method includes obtaining a transport address set (TAS) with respect to a home remote access server (RAS) from an external server; registering the obtained TAS to a transport address resolution (TAR) server; receiving an IP packet transported from a remote access client (RAC) using the registered TAS; and transporting a response packet along a transport path of the received IP packet. Thus, an RAC can remotely access an RAS in a network comprising an NAT device, and an optimum communication path can be determined.

27 Claims, 5 Drawing Sheets

OTHER PUBLICATIONS

Search Report issued Apr. 5, 2012 by the European Patent Office in counterpart European Application No. 09702527.4.

Examination Report issued Apr. 18, 2012 by the European Patent Office in counterpart European Application No. 09702527.4.

Rosenberg, J. "Interactive Connectivity Establishment (ICE): A Methodology for Network Address Translator (NAT) Traversal for Offer/Answer Protocols; draft-ietf-mmusic-ice-09.txt" The Internet Society, Jun. 26, 2006, vol. mmusic, No. 9, pp. 1-109. XP015044857.

Boulton C. et al. "Best Current Practices for NAT Traversal for SIP; draft-ietf-sipping-nat-scenarios-07.txt" The IETF Trust, Jul. 9, 2007, vol. sipping, No. 7, pp. 1-58. XP015051703.

Rosenberg, J. et al. "Simple Traversal of UDP Through Network Address Translators (NAT) (STUN); draft-ietf-behave-rfc3489bis-03.txt", Feb. 1, 2006, vol. behave, No. 3, pp. 1-53. XP015043580.

Rosenberg, J. et al. "Session Traversal Utilities for (NAT) (STUN); draft-ietf-behave-rfc3489bis-10.txt", The IETF Trust, Sep. 13, 2007, vol. behave No. 10, pp. 1-47. XP015051097.

Communication dated Sep. 5, 2012 issued by the State Intellectual Property Office of PR China in counterpart Chinese Patent Application No. 200980109192.7.

\* cited by examiner

FIG. 1

| Case | Home | ISP Network | NAT | RAC |
|---|---|---|---|---|
| 1 | Gateway (UPnP IGD support) | public | no NAT / any type NAT | RAC |
| 2 | Home RAS | public | no NAT | RAC |
| 3 | Home RAS | Any type of NAT | full cone NAT | RAC |
| 4 | Home RAS | Any type of NAT | non full cone NAT | RAC |

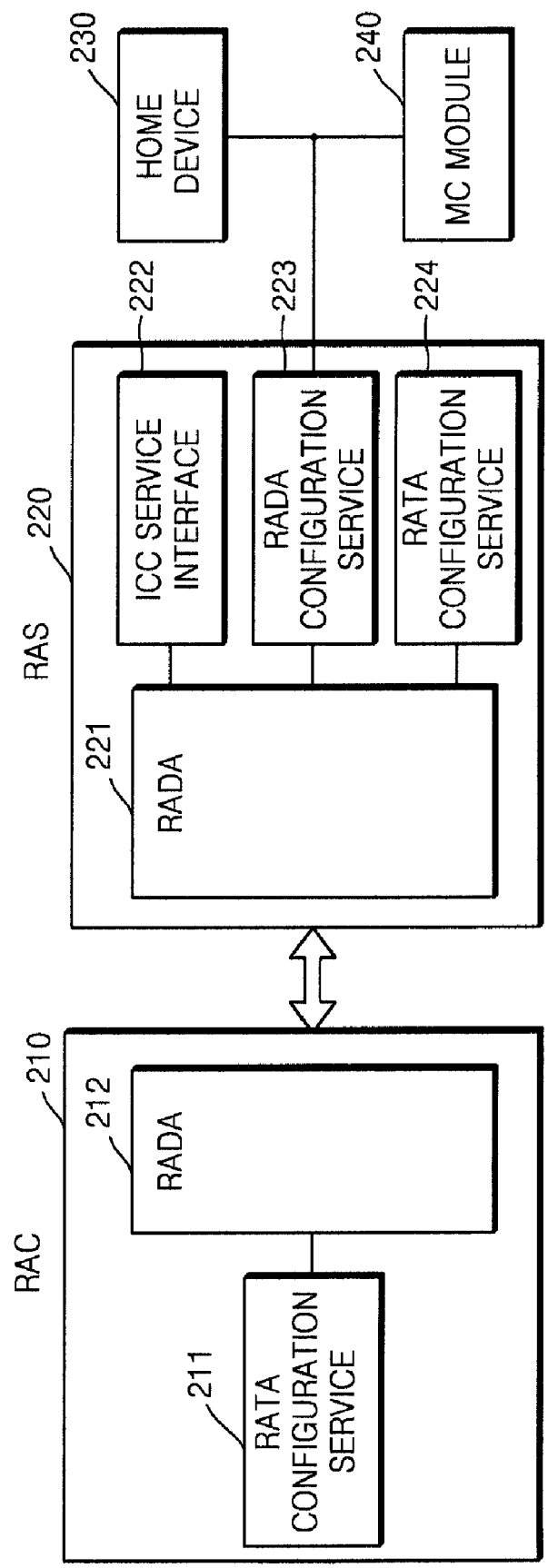
FIG. 2 (RELATED)

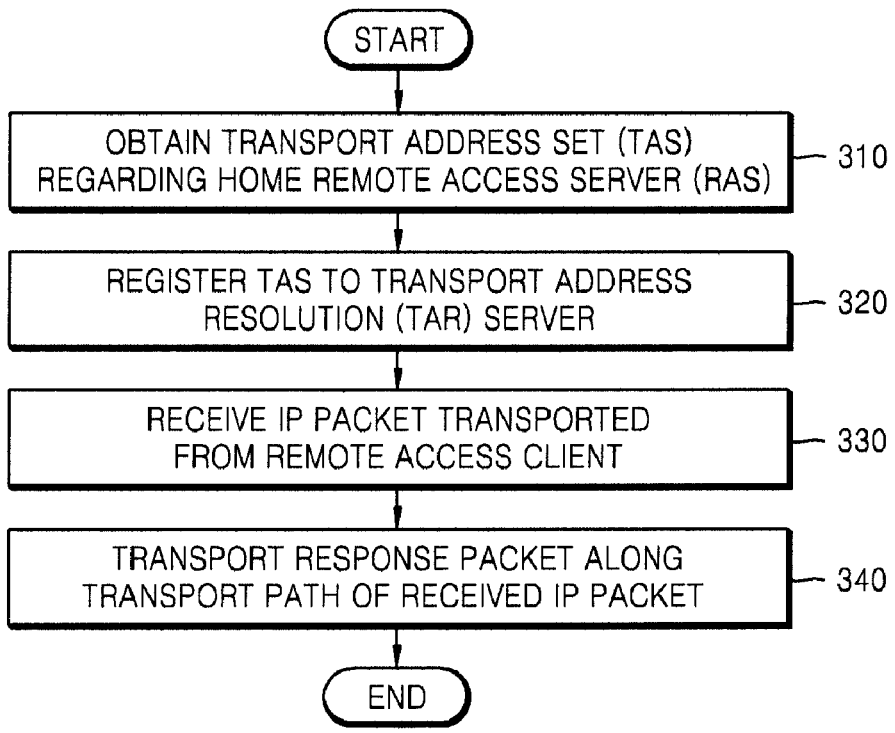
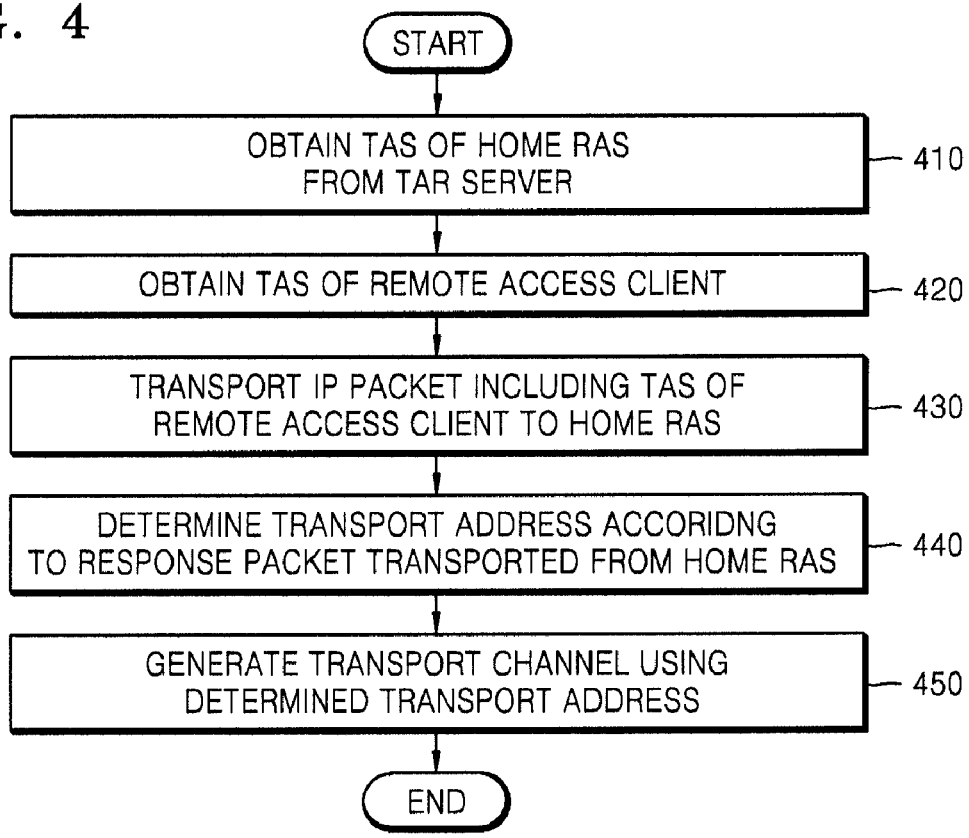

REMOTE ACCESS METHOD IN NETWORK ENVIRONMENT COMPRISING NAT DEVICE

CROSS-REFERENCE TO RELATED PATENT APPLICATION

This application claims priority from Korean Patent Application No. 10-2008-0067204, filed on Jul. 10, 2008 in the Korean Intellectual Property Office, and U.S. Provisional Patent Application No. 61/021,175, filed on Jan. 15, 2008 in the United States Patent and Trademark Office, the disclosures of which are incorporated herein by reference in their entirety.

BACKGROUND OF THE INVENTION

1. Field of the Invention

Apparatuses and methods consistent with the present invention relate to a remote access (RA), and more particularly, to a remote access between a remote access client (RAC) and a remote access server (RAS) in environments in which various network address translation (NAT) devices are applied.

2. Description of the Related Art

FIG. 1 is a diagram showing cases of network address translation (NAT) applied in a Universal Plug and Play (UPnP) remote access process.

Referring to FIG. 1, various scenarios are shown according to the position of an NAT device. As shown in Cases 1 through 4, the NAT device may be on a home gateway or in an Internet Service Provider (ISP) network. AN NAT device positioned in front of a Remote Access Client (RAC) indicates an NAT device that is on a gateway in a home network to which the RAC belongs, or an NAT device that is in an ISP network.

In Case 1, no NAT device is present between a home gateway and a public network, and only one NAT device is positioned on the home gateway between an RAC and a public network. Here, the home gateway is limited to supporting an Internet Gateway Device (UPnP IGD).

In Cases 2 through 4, an NAT device is present between a RAS, that is, a home RAS, and a public network. Cases 2 through 4 are classified according to whether an NAT device is present in front of an RAC, and if an NAT is present in front of an RAC, the cases may be classified again according to the type of the NAT device. In Case 2, no NAT device is present, and in Cases 3 and 4, an NAT device is present. The NAT device of Case 3 is a Full Cone NAT, and the NAT device of Case 4 is a non-full cone NAT.

FIG. 2 is a block diagram illustrating a configuration of a related art UPnP Remote Access Architecture v1.0.

The Related Art UPnP Remote Access Architecture v1.0 operates as follows.

First, a Management Console (MC) module 240 receives an external IP address from an IGD, and calls an Inbound Connection Configuration (ICC) service interface 222 of an RAS 220 to set addresses of a Simple Traversal of User Datagram Protocol through NAT (STUN) server and a Dynamic Domain Name System (DDNS) server. Here, in addition to setting the addresses of the STUN and DDNS servers, the ICC service interface 222 can deliver information collected by a STUN client to the MC module 240. The information collected by a STUN client may be, for example, whether an RAS is with an IGD or not.

When an RAC 210 and the RAS 220 are in the same network, the MC module 240 calls Remote Access Transport Agent (RATA) Configuration services 211 and 224 of the RAS 220 and the RAC 210 to set a profile, which is a parameter for an RA transport channel.

After the RAC 210 is separated from the network, the RAC 210 establishes a Remote Access Transport (RAT) channel connection in the external network based on the above set RATA Configuration information.

Remote Access Discovery Agents (RADA) 212 and 221 of the RAC 210 and the RAS 220 synchronize network images via the generated RAT channel. Here, the RAS 220 may set a filter of a device list of a local network that is exhibited to the outside via an RADA Configuration service 223. The RADA may synchronize tree-shaped network images with respect to an UPnP device list of local and remote networks. That is, when a device is added to a local network, an AddRemoteDevice interface of a remote network is called to add a new device to a node of a network image.

Finally, the RAC 210 discovers a service of the RAS 220 from the synchronized network image, and the RAC 210 may request the discovered service by itself via a RAT channel. Here, the RAS 220 functions as a router, and the home device 230 actually responds to the request of the RAC 210.

The above-described related art UPnP Remote Access Architecture v1.0 can support only Case 1 of FIG. 1. That is, the related art UPnP Remote Access Architecture v1.0 can support only Case 1 of FIG. 1 with no regard to whether an NAT device is present in front of an RAC or not, or to the type of the NAT device, as long as a gateway is directly connected to a public network and an RAS is present in a separate device in the home or on a gateway. However, if an NAT device is present in front of an RAS as in Cases 2 through 4, an RAC cannot connect to an RAS properly.

SUMMARY OF THE INVENTION

The present invention provides a remote access method between an RAC and an RAS even when an RAS device is present in a network configured with NAT.

According to an aspect of the present invention, there is provided a remote access method in a network including an NAT device, the method including: obtaining a transport address set (TAS) with respect to a home RAS from an external server; registering the obtained TAS to a transport address resolution (TAR) server; receiving an IP packet transported from an RAC using the registered TAS; and transporting a response packet along a transport path of the received IP packet.

The TAS may include at least one of a transport address, a reflexive transport address, and a relaying transport address of the home RAS.

The transport address of the home RAS may include an IP address allocated for the home RAS and a port number of a service to access.

The reflexive transport address of the home RAS may include an IP address allocated to an NAT device included in a network in which the home RAS is located, and a port number of a service to access.

The relaying transport address of the home RAS may include an IP address allocated to the external server and a port number of a service to access.

In the obtaining a TAS with respect to the home RAS, a simple traversal of UDP through NAT (STUN)/traversal using relay NAT (TURN) protocol may be used.

In the registering of the TAS to a TAR server, a name of a service to access may be used as a keyword to register the obtained TAS to the TAR server.

The registering of the TAS to a TAR server may further include transporting the TAS to the TAR server by extending an HTTP header and method or by defining a simple object access protocol (SOAP) message.

The transporting of a response packet may further include comparing an identifier, that is included in the received IP packet and represents a transport path of the received IP packet, with the TAS regarding the home RAS.

In the transporting of the response packet, a response packet may be transported regarding a packet having the same identifier as the TAS based on the comparison result, and if the number of packets having the same identifier as the TAS is two or more, only one packet may be responded according to the priority of the transport addresses included in TAS.

The priority may be decreased in the order of the transport address, the reflexive transport address, and the relaying transport address of the home RAS.

In the transporting a response packet, if an identifier identical to the TAS is present based on the comparison result, a response packet, to which an identifier identical to that of the received IP packet is added, may be transported to the RAC.

The transporting of a response packet may further include, if the identical identifier is a relaying transport address based on the comparison result, transporting additional response packets to the transport address and the reflexive transport address of the RAC which has transported the IP packet, wherein the additional response packets include the transport address and the reflexive transport address of the RAC as individual identifiers.

According to another aspect of the present invention, there is provided a remote access method of an RAC in a network including an NAT device, the method including: obtaining a TAS of a home RAS from a TAR server; obtaining a TAS of the RAC from an external server; transporting an IP packet including the TAS of the obtained RAC to the home RAS; determining a transport address according to a response packet transported from the home RAS; and generating a transport channel using the determined transport address.

In the transporting of an IP packet to the home RAS, the IP packet may be transported using individual transport addresses included in the TAS of the obtained home RAS.

In the transporting of an IP packet to the home RAS, an IP packet may be transported to the home RAS, wherein the IP packet includes the individual transport addresses of the home RAS, which are destination addresses (DA) to which the IP packet is to be transported, as individual identifiers.

In the obtaining a TAS of the RAC, a simple traversal of UDP through NAT (STUN)/traversal using relay NAT (TURN) protocol may be used.

The obtaining of a TAS of the home RAS may further include transporting the TAS to the TAR server by extending an HTTP header and method or by defining an SOAP message.

The determining a transport address may further include checking an identifier included in the response packet transported from the home RAS, and if the checked identifier is one individual transport address among the TAS of the home RAS, the identifier may be determined as a destination address of an application protocol.

In the determining of a transport address, if the checked identifier is one individual transport address among a TAS of the RAC included in the IP packet, a source address of a received response packet may be determined as a destination address of an application protocol.

According to another aspect of the present invention, there is provided a computer readable recording medium encoded with a computer program for executing the remote access method.

BRIEF DESCRIPTION OF THE DRAWINGS

The above and other aspects of the present invention will become more apparent by describing in detail exemplary embodiments thereof with reference to the attached drawings in which:

FIG. 1 is a table showing various scenarios according to the position of a network address translation (NAT) device in a network;

FIG. 2 is a functional block diagram showing a related art UpnP Remote Access Architecture v1.0;

FIG. 3 is a flowchart illustrating an access method of a home RAS, according to an exemplary embodiment of the present invention;

FIG. 4 is a flowchart illustrating an access method of an RAC, according to an exemplary embodiment of the present invention;

Figure 5:
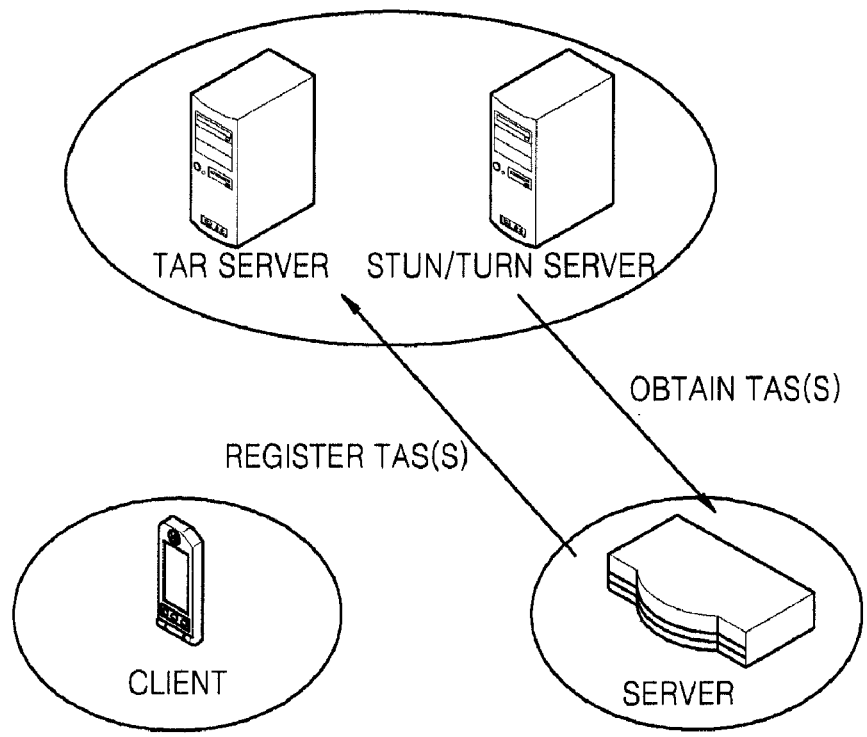
FIG. 5 is a diagram illustrating a process of allocating a TAS in a server device and registering the TAS to a TAR server.

Like reference numerals denote like elements in these drawings. Although the drawings illustrate exemplary embodiments of the present invention, the drawings are not illustrated to scale; however, in order to fully describe the present invention, some portions of the present invention may be exaggerated in the drawings.

DETAILED DESCRIPTION OF THE INVENTION

The attached drawings for illustrating exemplary embodiments of the present invention are referred to in order to gain a sufficient understanding of the present invention, the merits thereof, and the objectives accomplished by the implementation of the present invention. Exemplary embodiments of the present invention will now be described more fully with reference to the accompanying drawings.

In the present invention, in order to establish a P2P connection between a client and a server, the two terminals perform NAT traversal using a transport address (TA). Examples of an NAT device include a Full Cone, a Restricted Cone, a Port Restricted Cone, and a Symmetric Cone NAT device.

A transport address includes a pair formed of an IP address and a port number, and in an exemplary embodiment of the present invention, three types of transport addresses—a transport address, a reflexive transport address, and a relaying transport address—are used.

A transport address is formed of a pair formed of an IP address allocated to a terminal itself and a port number of a service to access. A reflexive transport address is formed of a pair formed of an authorized IP address allocated for an NAT device and a port number that is allocated to a terminal and a service to be connected by the NAT device. A relaying transport address is formed of a pair formed of an authorized IP address allocated to a Traversal Using Relay NAT (TURN) server and a port number allocated to a terminal and a service to be connected by the TURN server. In addition, a TAS refers to a bundle of individual transport addresses.

When using a transport address or a reflexive transport address, a P2P connection can be directly established between terminals. When using a relaying transport address, terminals are connected by relaying via a TURN server.

FIG. 3 is a flowchart illustrating an access method of a home RAS, according to an exemplary embodiment of the present invention, and FIG. 4 is a flowchart illustrating an access method of an RAC, according to another exemplary embodiment of the present invention.

Referring to FIG. 3, in a network comprising an NAT device, a home RAS obtains a TAS with respect to the home RAS from an external server in operation 310, the obtained TAS is registered in a transport address resolution (TAR) server in operation 320, an IP packet transported from an RAC is received using the registered TAS in operation 330, and a response packet is transported along a transport path of the received IP packet in operation 340.

Referring to FIG. 4, in a network comprising an NAT device, an RAC obtains a TAS of a home RAS from a TAR server in operation 410, a TAS of an RAC is obtained from an external server in operation 420, an IP packet including the obtained TAS of the RAC is transported to the home RAS in operation 430, a transport address is determined according to a response packet transported from the home RAS in operation 440, and a transport channel is generated using the determined transport address in operation 450.

Hereinafter, the remote access method between a home RAS and an RAC in a network comprising an NAT device will be described in detail with reference to specific operations of FIGS. 3 and 4.

FIG. 5 is a diagram illustrating a process of allocating a TAS to a server device and registering the TAS to a TAR server.

First, a server device gets a TAS(S) including a transport address, a reflexive transport address, and a relaying transport address for the service device using a STUN/TURN protocol. Here, the (S) of TAS(S) indicates that the TAS is of the service device.

Here, when using a reflexive transport address or a relaying transport address, a keep alive message is periodically transported to a STUN/TURN server in order to keep the allocated TAS.

Next, the allocated TAS is registered in a TAR server using a service name as a keyword. Here, a protocol can register a plurality of TASs regarding a predetermined keyword and update the TASs dynamically, and any protocol that enables a third person to search may be used. In other words, any protocol to which registering, updating, or querying is defined may be used. For example, an extended HTTP header may be used or a protocol defined using a Simple Object Access Protocol (SOAP), or a Dynamic Delegation Discovery System (DDDS) technology may be used.

Figure 6:
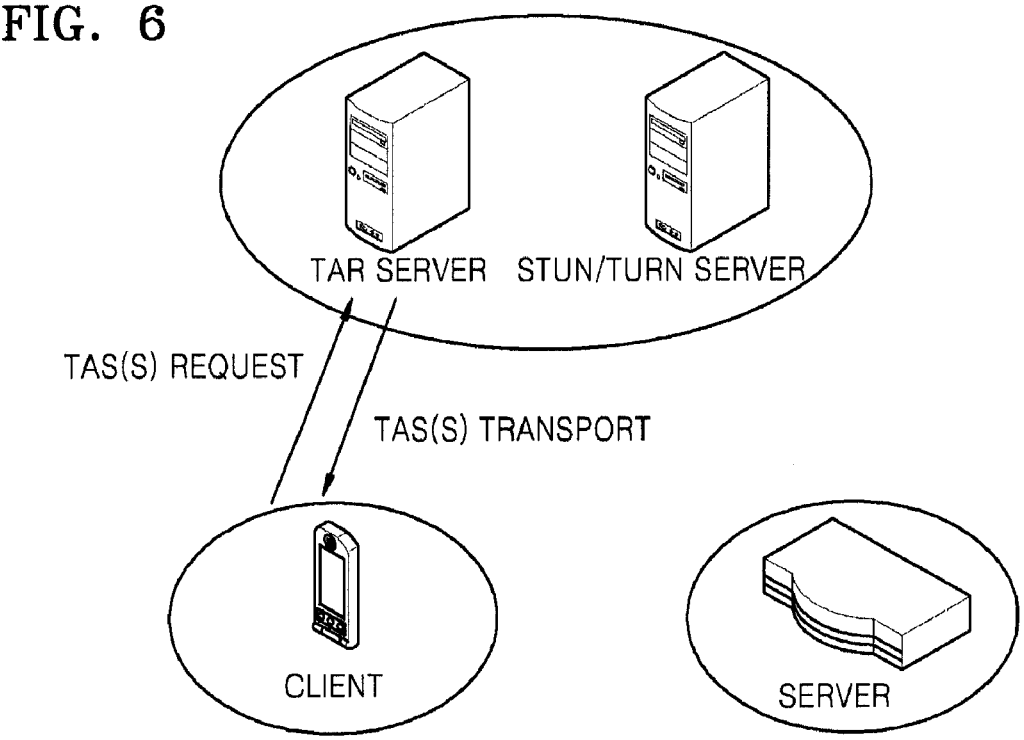
FIG. 6 is a diagram illustrating a process of obtaining a TAS of a server device in a client device.

FIG. 6 is a diagram illustrating a process of obtaining a TAS of a server device in a client device.

First, the client device queries a TAS of the server device, and a TAR server responds to the query of the client device and transports a TAS of a corresponding server device. Here, a protocol used by the client device in order to obtain a TAS of a server device mapped with a predetermined service name, is the same as the protocol used when registering a TAS of a server device to a TAR server as described with reference to FIG. 5.

Figure 7:
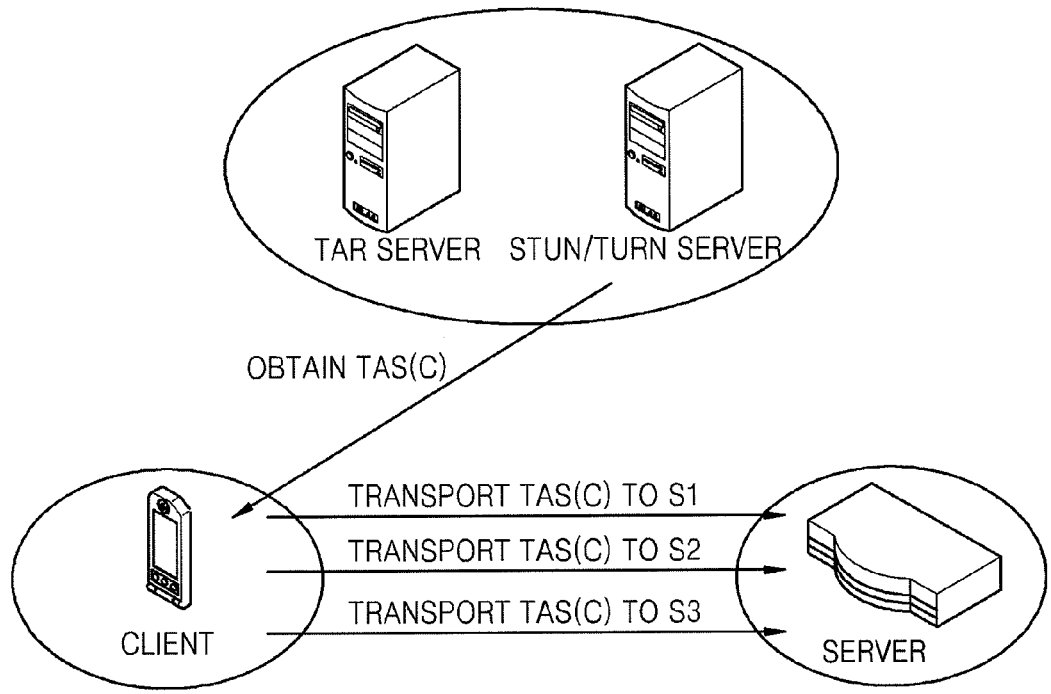
FIG. 7 is a diagram illustrating a process of allocating a TAS in a client device and transporting the TAS to a server device.

FIG. 7 is a diagram illustrating a process of allocating a TAS in the client device and transporting the TAS to a server device.

First, a client device gets a TAS(C) allocated, which is a TAS including a transport address regarding itself and a reflexive transport address, using a STUN/TURN protocol. Here, the (C) of TAS(C) indicates that the TAS is of a client device.

Meanwhile, the client device does not need a relaying transport address, and since address allocation and a process for remote access are performed at the same time, there is no need to keep a keep alive message.

The client device transports its allocated TAS(C) to a server device. Here, the transportation is performed three times, and destination addresses (DA) of the three kinds of packets being transported are individual transport addresses belonging to the TAS(S) of the service device obtained in the operation regarding FIG. 6. That is, the individual transport addresses includes a transport address S1, a reflexive transport address S2, and a relaying transport address S3 of the server device.

An identifier is added to each packet being transported to the service device. Since a source address and a destination address of a packet may be changed regarding each router while the packet is being transported between networks, an identifier is added to enable checking through which path the packet transported by the client device is transported to the server device. The identifier is a destination address of the packet being transported and is added to a body of the packet.

Accordingly, by using its own TAS and the identifier, the server device, which has received the packet, can judge whether the packet is received through the transport address, the reflexive transport address or the relaying transport address of the server device.

Figure 8:
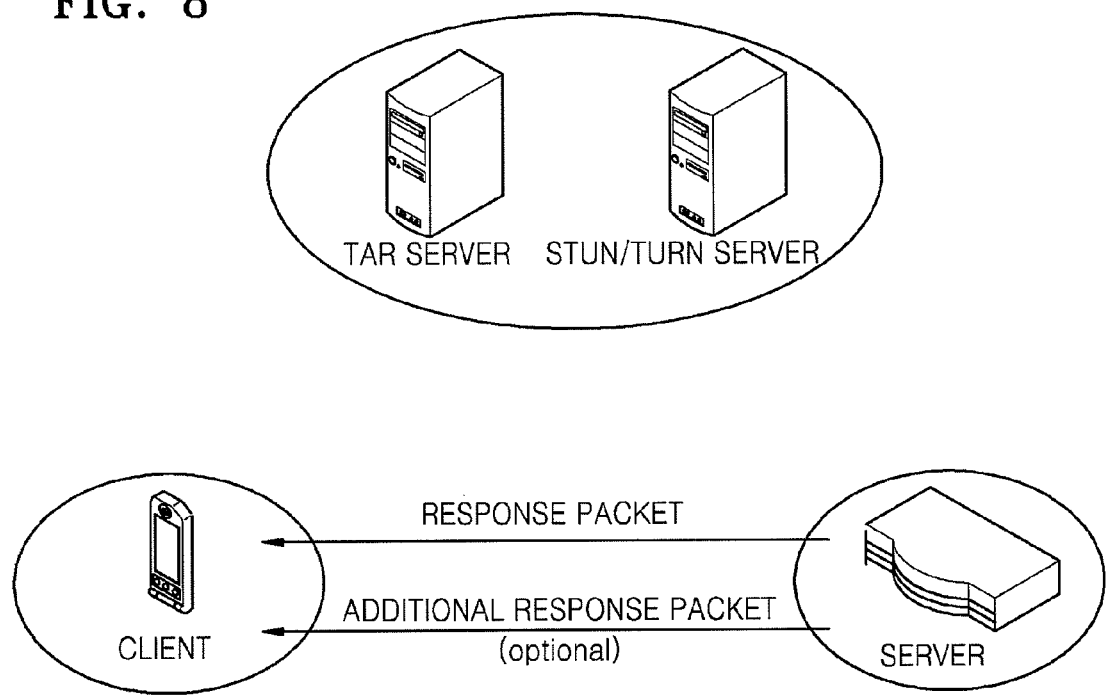
FIG. 8 is a diagram illustrating a process of comparing an identifier of a packet received by a server device with a TAS and transporting a response packet to a client device.

FIG. 8 is a diagram illustrating a process of comparing an identifier of a packet received by a server device with a TAS, and transporting a response packet to a client device.

(i) When a packet transmitted by a client device is received through a transport address or a reflexive transport address of a server device, the client device can determine an optimum path to directly establish a P2P connection to the server device using the corresponding address.

(ii) When a packet transmitted by the client device is received through a relaying transport address of a server device, it means that a restricted NAT/firewall is present in a network of the server device. In this case, whether to establish a connection directly or by relaying is determined according to whether there is a restricted NAT/firewall in a network of the client device.

The processes of (i) and (ii) will be described in detail hereinafter.

After receiving a first packet, the server device compares an identifier of the received packet with the TAS of the server device while being on standby for a predetermined time. The server device transports a response packet with respect to a packet having an identifier identical to the TAS, based on the comparison result. Here, the server device responds only to one packet according to the priority, and the priority is in the order of the transport address, the reflexive transport address, and the relaying transport address.

For example, if the identifier of the packet received by the server device is a transport address or a reflexive transport address, the server device directly responds to the received packet to establish a P2P connection between the two terminals. Here, an identifier identical to that of the received packet is added to the response packet.

Meanwhile, if the identifier of the packet received by the server device is a relaying transport address, the server device transports an additional response packet besides responding to the received packet. As described above, the packet transmitted by the client device and received through the relaying transport address of the server device indicates that a restricted NAT/firewall is present in the network of the server device. Accordingly, the additional response packet that is transported by the server device at this time is for checking whether a restricted NAT/firewall is also present at the client device. An additional response packet is transported to the transport address and the reflexive transport address of the client device, and identifiers of the additional response packet become the transport address and the reflexive transport address of the client device. Meanwhile, an identifier of a basic response packet is the relaying transport address of the server device.

The operation of the client device thereafter is as follows. The client device transports its TAS allocated in the operation regarding FIG. 7 to the server device, and stays on standby for a predetermined time, waiting for a response. When a response is sent from the server device, an identifier of a packet is analyzed to select only one packet according to the priority below and determine an optimum path. The priority is in the order of: transport address (S)→reflexive transport address (S)→transport address (C)→reflexive transport address (C)→relaying transport address (S). Here, (S) and (C) distinguish whether the transport address is of the server device (e.g., (S)) or the client device (e.g., (C)).

Accordingly, if an identifier of the packet received by the client device is one of the TAS(S) of the server device according to the above-described priority, the identifier can be used as a destination address (DA) of an application protocol.

If the identifier of the packet received by the client device is one of the TAS(C) of the client device transported in the operation regarding FIG. 7, a source address (SA) of the received packet can be used as a DA of an application protocol.

If a restricted NAT/firewall is present in the network of the server device and a restricted NAT/firewall is also present in the network of the client device according to the above-described priority, a relaying access method is used by using the relaying transport address. This is because if a restricted NAT/firewall is present in the network of the server device, the transport address (S) and the reflexive transport address (S) of the server device cannot be used, and if a restricted NAT/firewall is present in the network of the client device, the transport address (C) and the reflexive transport address (C) of the client device cannot be used, either.

As described above, a protocol used in the operations described with reference to FIGS. 5 and 6 to communicate with the TAR server may be any protocol to which a plurality of TAS can be registered with respect to a predetermined keyword, which can be updated dynamically, and searched by a third person. In other words, any protocol to which registering, updating, and querying are defined, may be used. Hereinafter, a method of extending a HTTP header and HTTP method, and a method of defining a SOAP message and transporting the SOAP message via HTTP will be described.

1. First, a case using a HTTP header and method is as follows.

(i) Register/Update
TA_REGISTER*HTTP/1.1
SERVICE: Service Name/Host Name
TRANSPORT_ADDRESS: IP Address:Port Number
REFLEXIVE: IP Address:Port Number
RELAYING: IP Address:Port Number Here, a TA_REGISTER method and SERVICE, TRANSPORT_ADDRESS, REFLEXIVE, and RELAYING headers can be defined anew. Here, a service name/host name, and IP address: port number are assigned certain values when a packet is actually being transported. Update can be conducted using a register message.

(ii) Query
TA QUERY*HTTP/1.1
SERVICE: Service Name/Host Name (iii) Response
HTTP/1.1 200 OK
SERVICE: Service Name/Host Name
TRANSPORT_ADDRESS: IP Address:Port Number
REFLEXIVE: IP Address:Port Number
RELAYING: IP Address:Port Number 2. A case defining a SOAP message is as follows.

(i) Register/Update

```
<SOAP-ENV:Envelope
xmlns:SOAP-ENV="http://schemas.xmlsoap.org/soap/envelope">
 <SOAP-ENV:Header/>
  <Register xmlns="namespace">
 </SOAP-ENV:Header>
 <SOAP-ENV:Body xmlns="namespace">
  <Service>Service Name/Host Name</Service>
  <Transport_Address>IP Address:Port Number</Transport_Address>
  <Reflexive>IP Address:Port Number</Reflexive>
  <Relaying>IP Address:Port Number</Relaying>
 </SOAP-ENV:Body>
</SOAP-ENV:Envelope>
```

(ii) Query

```
  <SOAP-ENV:Envelope
  xmlns:SOAP-ENV="http://schemas.xmlsoap.org/soap/envelope">
    <SOAP-ENV:Header/>
     <Query xmlns="namespace">
    </SOAP-ENV:Header>
    <SOAP-ENV:Body xmlns="namespace">
     <Service>Service Name/Host Name</Service>
    </SOAP-ENV:Body>
   </SOAP-ENV:Envelope>
```

(iii) Response

```
<SOAP-ENV:Envelope
xmlns:SOAP-ENV="http://schemas.xmlsoap.org/soap/envelope">
 <SOAP-ENV:Header/>
  <Response xmlns="namespace">
 </SOAP-ENV:Header>
 <SOAP-ENV:Body xmlns="namespace">
  <Service>Service Name</Service>
  <Transport_Address>IP Address:Port Number</Transport_Address>
  <Reflexive>IP Address:Port Number</Reflexive>
  <Relaying>IP Address:Port Number</Relaying>
 </SOAP-ENV:Body>
</SOAP-ENV:Envelope>
```

According to the present invention, by using two terminals, a server and a client, capable of understanding a STUN/TURN protocol, and storing and searching transport addresses, a P2P connection can be established between the two terminals. To this end, the server registers to a TAR server its TAS allocated using the STUN/TURN protocol under a certain service name, and the client receives a TAS which it can access, by using a desired service name to access. Then, the two terminals can determine an optimum transport address based on the TAS according to predetermined procedure, and an application protocol is connected using the optimum transport address. In the current embodiment of the present invention, two terminals belong to the NAT device, and thus a relaying access method is used only when no transport address is present and when a relaying transport address is present.

According to the remote access method and apparatus in a network comprising an NAT device of the exemplary embodiments of the present invention, an RAS registers a TAS, which can be connected to the RAS itself, to a server, and an RAC queries and collects information about transport addresses which can be connected to the RAS. Accordingly, in a network comprising an NAT device, the RAC can be remotely accessed to the RAS regardless of the network configuration of the RAC, even in an environment including an RAS, and furthermore, an optimum communication path can be determined according to the priority of the transport addresses included in TAS.

The above-described remote access method in the network comprising an NAT device according to the exemplary embodiments of the present invention can be written as a computer program and can be implemented in general-use digital computers that execute the program using a computer readable recording medium.

Also, the data structure used in the present invention as described above can be recorded on a computer readable recording medium using various devices.

Examples of the computer readable recording medium include magnetic storage media (e.g., ROM, floppy disks, hard disks, etc.), optical recording media (e.g., CD-ROMs, or DVDs), and other storage media.

While this invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A remote access method in a network in which a home remote access server (RAS) is configured with a network address translation (NAT) device, the method comprising:
    obtaining a transport address set (TAS) with respect to the home remote access server (RAS) from an external server;
    registering the obtained TAS to a transport address resolution (TAR) server using a service name as a keyword;
    receiving an Internet Protocol (IP) packet transported from a remote access client (RAC) using the registered TAS; and
    transporting a response packet along a transport path of the received IP packet,
    wherein the TAS of the RAS comprises a transport address, a reflexive transport address, and a relaying transport address of the home RAS,
    wherein the transport address and the reflexive transport address are types of addresses that provide establishment of a point to point connection between the RAS and the RAC,
    wherein the relaying transport address is a different type of address from the reflective transport address and the transport address, which provides an indirect connection between the RAS and the RAC via an intermediate device, and
    wherein the relaying transport address is an additional field of the RAS not present in the TAS of the RAC.

2. The method of claim 1, wherein the transport address of the home RAS comprises an IP address allocated for the home RAS and a port number of a service to access.

3. The method of claim 2, wherein the reflexive transport address of the home RAS comprises an IP address allocated to an NAT device included in a network in which the home RAS is located, and a port number of a service to access.

4. The method of claim 3, wherein the relaying transport address of the home RAS comprises an IP address allocated to the external server and a port number of a service to access.

5. The method of claim 1, wherein, in the obtaining a TAS with respect to the home RAS, a simple traversal of UDP through NAT (STUN)/traversal using relay NAT (TURN) protocol is used.

6. The method of claim 1, wherein, the service name used as the keyword to register the obtained TAS to the TAR server is shared with at least one other TAS.

7. The method of claim 6, wherein the registering of the TAS to a TAR server further comprises transporting the TAS to the TAR server by extending an HTTP header and method or by defining a simple object access protocol (SOAP) message.

8. The method of claim 1, wherein the transporting of a response packet further comprises comparing an identifier, that is included in the received IP packet and represents a transport path of the received IP packet, with the TAS regarding the home RAS.

9. The method of claim 8, wherein, in the transporting of the response packet, a response packet is transported regarding a packet having the same identifier as the TAS based on the comparison result, and if the number of packets having the same identifier as the TAS is two or more, only one packet is responded according to the priority of the transport addresses included in TAS.

10. The method of claim 9, wherein the priority is decreased in the order of the transport address, the reflexive transport address, and the relaying transport address of the home RAS.

11. A remote access method in a network comprising a network address translation (NAT) device, the method comprising:
    obtaining a transport address set (TAS) with respect to a home remote access server (RAS) from an external server;
    registering the obtained TAS to a transport address resolution (TAR) server;
    receiving an Internet Protocol (IP) packet transported from a remote access client (RAC) using the registered TAS; and
    transporting a response packet along a transport path of the received IP packet,
    wherein the TAS comprises at least one of a transport address, a reflexive transport address, and a relaying transport address of the home RAS,
    wherein the transporting of a response packet further comprises comparing an identifier, that is included in the received IP packet and represents a transport path of the received IP packet, with the TAS regarding the home RAS,
    wherein, in the transporting of the response packet, a response packet is transported regarding a packet having the same identifier as the TAS based on the comparison result, and if the number of packets having the same identifier as the TAS is two or more, only one packet is responded according to the priority of the transport addresses included in TAS,
    wherein the priority is decreased in the order of the transport address, the reflexive transport address, and the relaying transport address of the home RAS, and wherein, in the transporting a response packet, if an identifier identical to the TAS is present, based on the comparison result, a response packet to which an identifier identical to that of the received IP packet is added, is transported to the RAC.

12. The method of claim 11, wherein the transporting of a response packet further comprises, if the identical identifier is a relaying transport address, based on the comparison result, transporting additional response packets to the transport address and the reflexive transport address of the RAC which has transported the IP packet,
wherein the additional response packets comprise the transport address and the reflexive transport address of the RAC as individual identifiers.

13. A remote access method of a remote access client (RAC) in a network comprising a network address translation (NAT) device, the method comprising:
obtaining using a service name a transport address set (TAS) of a home remote access server (RAS) from a transport address resolution (TAR) server which is registered in the TAR server using the service name as a keyword;
obtaining a TAS of the RAC from an external server;
transporting an Internet Protocol (IP) packet comprising the obtained TAS of the RAC to the home RAS;
determining a transport address according to a response packet transported from the home RAS; and
generating a transport channel using the determined transport address,
wherein the TAS of the RAS comprises a transport address, a reflexive transport address, and a relaying transport address of the home RAS,
wherein the transport address and the reflexive transport address are types of addresses that provide establishment of a point to point connection between the RAS and the RAC,
wherein the relaying transport address is a different type of address from the reflective transport address and the transport address, which provides an indirect connection between the RAS and the RAC via an intermediate device, and
wherein the relaying transport address is an additional field not present in the TAS of the RAC.

14. The method of claim 13, wherein, in the transporting of an IP packet to the home RAS, the IP packet is transported using individual transport addresses included in the TAS of the obtained home RAS.

15. The method of claim 14, wherein, in the transporting of an IP packet to the home RAS, an IP packet is transported to the home RAS, wherein the IP packet comprises the individual transport addresses of the home RAS, which are destination addresses (DA) to which the IP packet is to be transported, as individual identifiers.

16. The method of claim 15, wherein, in the obtaining a TAS of the RAC, a simple traversal of UDP through NAT (STUN)/traversal using relay NAT (TURN) protocol is used.

17. The method of claim 15, wherein the obtaining of a TAS of the home RAS further comprises transporting the TAS to the TAR server by extending an HTTP header and method or by defining a simple object access protocol (SOAP) message.

18. The method of claim 13, wherein the determining a transport address further comprises checking an identifier included in the response packet transported from the home RAS, and if the checked identifier is one individual transport address among the TAS of the home RAS, the identifier is determined as a destination address of an application protocol.

19. The method of claim 18, wherein, in the determining of a transport address, if the checked identifier is one individual transport address among a TAS of the RAC included in the IP packet, a source address of a received response packet is determined as a destination address of an application protocol.

20. A non-transitory computer readable recording medium encoded with a computer program for causing a computer to execute a remote access method, the computer program comprising the procedures for:
obtaining a transport address set (TAS) with respect to a home remote access server (RAS) from an external server;
registering the obtained TAS to a transport address resolution (TAR) server using a service name as a keyword;
receiving an Internet Protocol (IP) packet transported from a remote access client (RAC) using the registered TAS; and
transporting a response packet along a transport path of the received IP packet,
wherein the TAS of the RAS comprises a transport address, a reflexive transport address, and a relaying transport address of the home RAS,
wherein the transport address and the reflexive transport address are types of addresses that provide establishment of a point to point connection between the RAS and the RAC,
wherein the relaying transport address is a different type of address from the reflective transport address and the transport address, which provides an indirect connection between the RAS and the RAC via an intermediate device, and
wherein the relaying transport address is an additional field not present in the TAS of the RAC.

21. A non-transitory computer readable recording medium encoded with a computer program for causing a computer to execute a remote access method, the computer program comprising the procedures for:
obtaining using a service name a transport address set (TAS) of a home remote access server (RAS) from a transport address resolution (TAR) server which registers the TAS using the service name as a keyword;
obtaining a TAS of a remote access client (RAC) from an external server;
transporting an IP packet comprising the TAS of the obtained RAC to the home RAS;
determining a transport address according to a response packet transported from the home RAS; and
generating a transport channel using the determined transport address,
wherein the TAS of the RAS comprises a transport address, a reflexive transport address, and a relaying transport address of the home RAS,
wherein the transport address and the reflexive transport address are types of addresses that provide establishment of a point to point connection between the RAS and the RAC,
wherein the relaying transport address is a different type of address from the reflective transport address and the transport address, which provides an indirect connection between the RAS and the RAC via an intermediate device, and wherein the relaying transport address is an additional field not present in the TAS of the RAC.

22. The method of claim 1, further comprises comparing an identifier included in the received IP packet with the TAS of the home RAS, wherein the transporting the response packet comprises a response packet to which an identifier identical to that of the received IP packet is added and is transported to the RAC if the identifier identical to the TAS is present based on the comparing,
- wherein the RAC transmits three types of packets to the RAS, a first packet having the transport address of the RAS in a body of a message, a second packet having the reflexive transport address of the RAS in the body of the message, and a third packet having a relaying transport address of the RAS in the body of the message,
- wherein the identifier is included in each of the first packet, the second packet, and the third packet and wherein based on a type of the received packet, the RAS determines if the NAT device is present in at least one of a network of the RAS and a network of the RAC.

23. The method of claim 1, wherein the home RAS and RAC communicate with each other using UPnP Remote Access Architecture.

24. The method of claim 22, wherein the RAS determines number of received packets with the same identifier, and if the number is greater than one packet, selects one packet from the number of received packets based on a priority order of the received types of packets.

25. The method of claim 1, wherein the RAC discovers services of the RAS by synchronizing images using remote access discovery agents when the NAT device is present in front of the RAS and before public network that connects the RAS with RAC.

26. The method of claim 1, wherein the RAS and RAC establishes a point to point connection by registering the TAS of the RAS and RAC that is allocated using the STUN/TURN protocol under the service name in the TAR server, which is then accessed to obtain the registered TAS, wherein the service name is shared among at least one other RAS.

27. The method of claim 1, wherein a plurality of TAS is registered with respect to the keyword using at least one of an extended HTTP protocol, SOAP, and Dynamic Delegation Discovery System (DDDS).

* * * * *